United States Patent [19]

Gupta

[11] 4,036,011
[45] July 19, 1977

[54] MULTIPLE VALVE SEQUENTIAL CONTROL FOR A COMBINED CYCLE POWER PLANT

[75] Inventor: Rash B. Gupta, West Deer Township, Pa.

[73] Assignee: Westinghouse Electric Corporation, Pittsburgh, Pa.

[21] Appl. No.: 653,045

[22] Filed: Jan. 28, 1976

[51] Int. Cl.$^2$ .......................... F02C 7/02; F01B 17/14
[52] U.S. Cl. ................................ 60/39.18 B; 137/599; 137/625.28
[58] Field of Search ................... 60/39.18 B; 137/110, 137/599, 625.28, 625.39

[56] References Cited
U.S. PATENT DOCUMENTS

| | | | |
|---|---|---|---|
| 3,135,282 | 6/1964 | Gray | 137/599 |
| 3,205,907 | 9/1965 | Reese | 137/110 |
| 3,357,359 | 12/1967 | Schaub | 137/110 |
| 3,879,616 | 4/1975 | Baker et al. | 60/39.18 B |
| 3,919,839 | 11/1975 | Aguet | 60/39.18 B |

*Primary Examiner*—Carlton R. Croyle
*Assistant Examiner*—L. J. Casaregola
*Attorney, Agent, or Firm*—E. F. Possessky

[57] ABSTRACT

In a combined cycle plant, a process flow demand signal is applied to multiple sequentially operated boiler feedwater valves through a single manual/automatic (M/A) station. Each valve is positioned in accordance with its position/flow characterization so that the total feedwater flow to the boiler satisfies the flow demand. To provide for bumpless manual to automatic transfer, valve position signals are characterized with the inverse of the respective valve characterizations in the flow region not covered by a lower order valve. The characterized outputs are set to zero in flow regions covered by a lower order valve. A high selection of the characterized outputs is performed and the selected signal corresponds to the process flow demand value which will enable a manual to automatic transfer without causing an upset in steam generator process flow or electric power generation.

9 Claims, 11 Drawing Figures

MULTIPLE VALVE SEQUENTIAL CONTROL FOR A COMBINED CYCLE POWER PLANT

BACKGROUND OF THE INVENTION

The present invention relates to boiler controls and more particularly to multiple sequential valve controls especially useful in boiler controls in combined cycle or other electric power plants.

Multiple valves may be employed to control a single boiler feedwater or other process flow in order to obtain relatively resolution control over a wide flow range. Typically, a M/A station is provided for placing the flow under either automatic process flow control or manual flow control. Provision normally is then needed for executing bumpless process transfers from manual to automatic modes of operation.

Although bumpless M/A transfer operations are generally well known in process control technologies, the known techniques generally are limited to applications where a M/A station is associated with each valve. Efficient systems have not been developed for cases in which a single M/A station is economically tied to multiple valves controlling a single flow in boiler or other processes.

SUMMARY OF THE INVENTION

In a boiler or other process control, a feedwater control or other flow control includes multiple sequential valves which are positioned by manual or automatic flow control through a single M/A station. Flow demand is partitioned into respective valve position demand signals by respective function generators. In manual operation, valve positions are weighted into an equivalent flow demand signal to which the automatic flow control is tracked for bumpless M/A transfer.

DESCRIPTION OF THE PREFERRED EMBODIMENT

Figure 1:
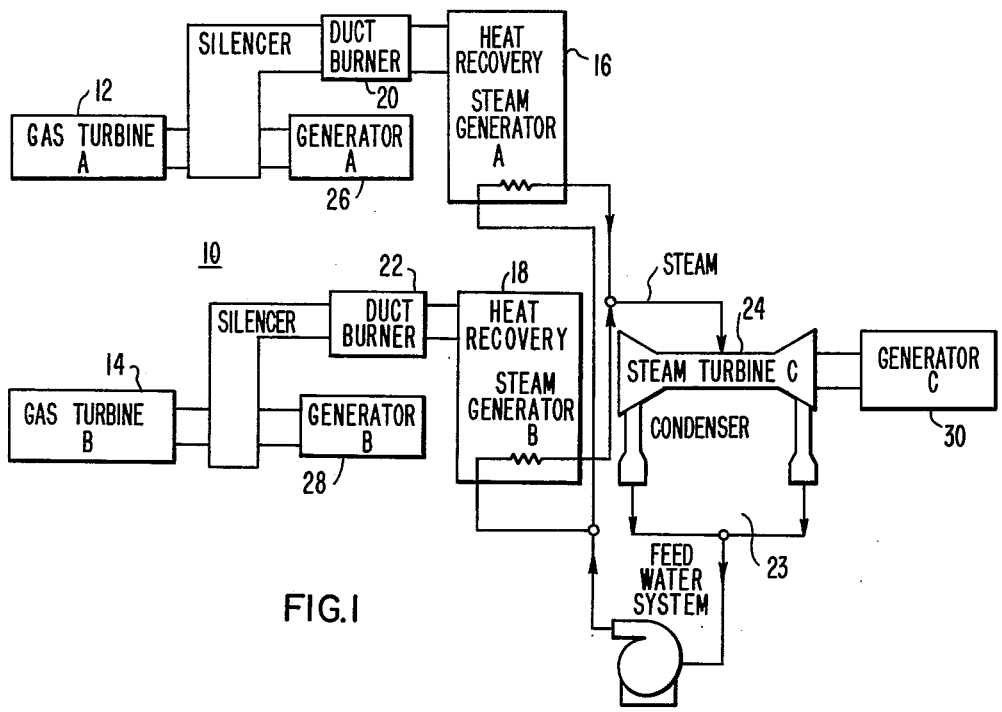
FIG. 1 shows a block diagram of a combined cycle power plant.

More particularly, there is shown in FIG. 1 a combined cycle electric power plant 10 in which gas turbines 12 and 14 burn fuel oil or natural gas and supply hot exhaust gas to the atmosphere through bypass stacks (not shown) or through ductworks to respective heat recovery steam generators (HRGS) 16 and 18. Oil or gas burners 20 and 22 are provided in the ductwork for supplementary heating of the exhaust gas. Heat is transferred from the hot gas to the $H_2O$ in the steam generators 16 and 18 to provide superheated steam which is bypassed (not indicated in FIG. 1) to a condenser 23 or used to drive a steam turbine 24. Respective generators 26, 28 and 30 are driven by the turbines 12, 14 and 24 to provide the plant electric power output.

Figure 2:
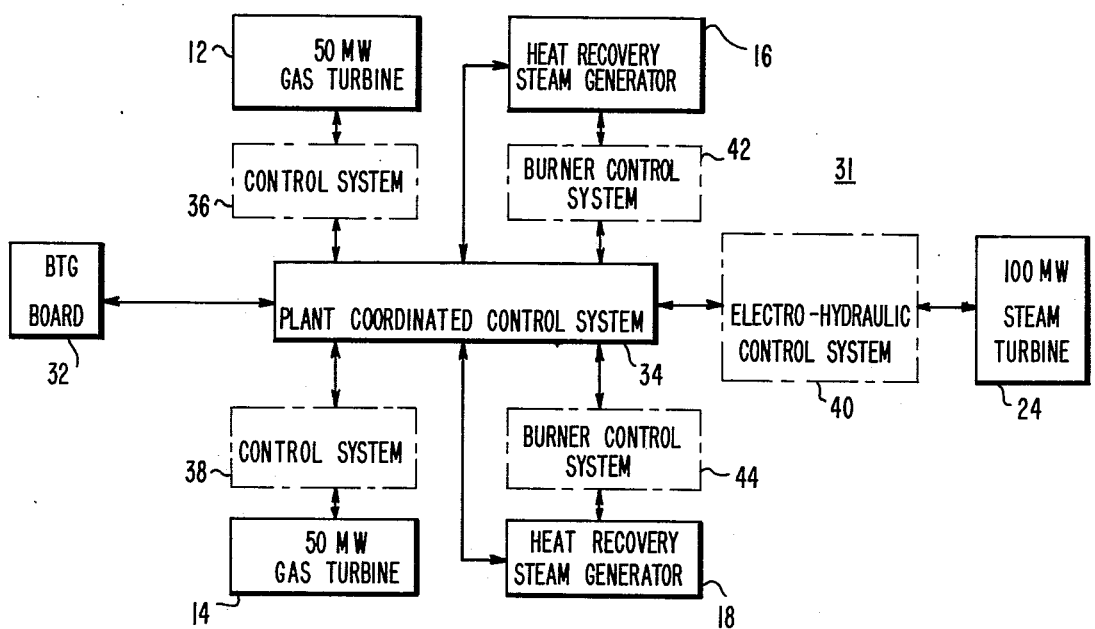
FIG. 2 shows a block diagram of a control system for the plant of FIG. 1.

As shown in FIG. 2, a control system 31 is organized to provide coordinated plant control. An operator panel or BTG board 32 provides for operator supervision over automatic plant operations under the control of a plant coordinated control 34. In turn, electronic gas turbine control system 36 and 38, an electrohydraulic steam turbine control system 40 and supplementary burner controls 42 and 44 function in the automatic coordinated mode under supervision of the plant coordinated control 34.

Generally, the plant coordinated control system 34 controls the temperature of the superheater outlet steam from each HRSG 16 or 18, feedwater flow to each HRSG 16 or 18, gas or oil fuel flow to the burners for each HRSG 16 or 18, and miscellaneous temperature loops associated with the steam turbine 24, condenser 23 and generator 30. In addition, the system provides coordinated load control of the whole plant and each gas turbine/HRSG combination so as to divide plant load in the most economical fashion among the plant elements and provide load setpoints to the gas turbines and steam turbine directly. The system 34 also provides a plant startup system which operates in both an automatic mode, in which the elements of the plant are monitored and automatically placed in service, and supervising mode where the same checks are made but no actions are taken and instead recommendations are made to the operator. The plant control system 34 includes a complete plant data acquisition system to monitor the plant and make performance calculations.

A plant like the plant 10 has been installed at a site in Sterlington, Louisiana. Equipment employed includes two General Electric Model MS-7000 50 MW gas turbine generators; one General Electric tandem compound, double flow, non-reheat, 100 MW steam turbine generator; and various auxiliaries such as feedwater pumps, cooling tower, etc. Each turbine is supplied by the manufacturer with a control system, and each HRSG is furnished with a COEN burner control system. The plant coordinated control includes a Westinghouse W2500 process control computer for plant startup and shutdown sequence control, plant status monitoring and making performance calculations and Westinghouse 7300 analog hardware for coordinated load control and for operation of HRSG and other control loops.

Figure 3:
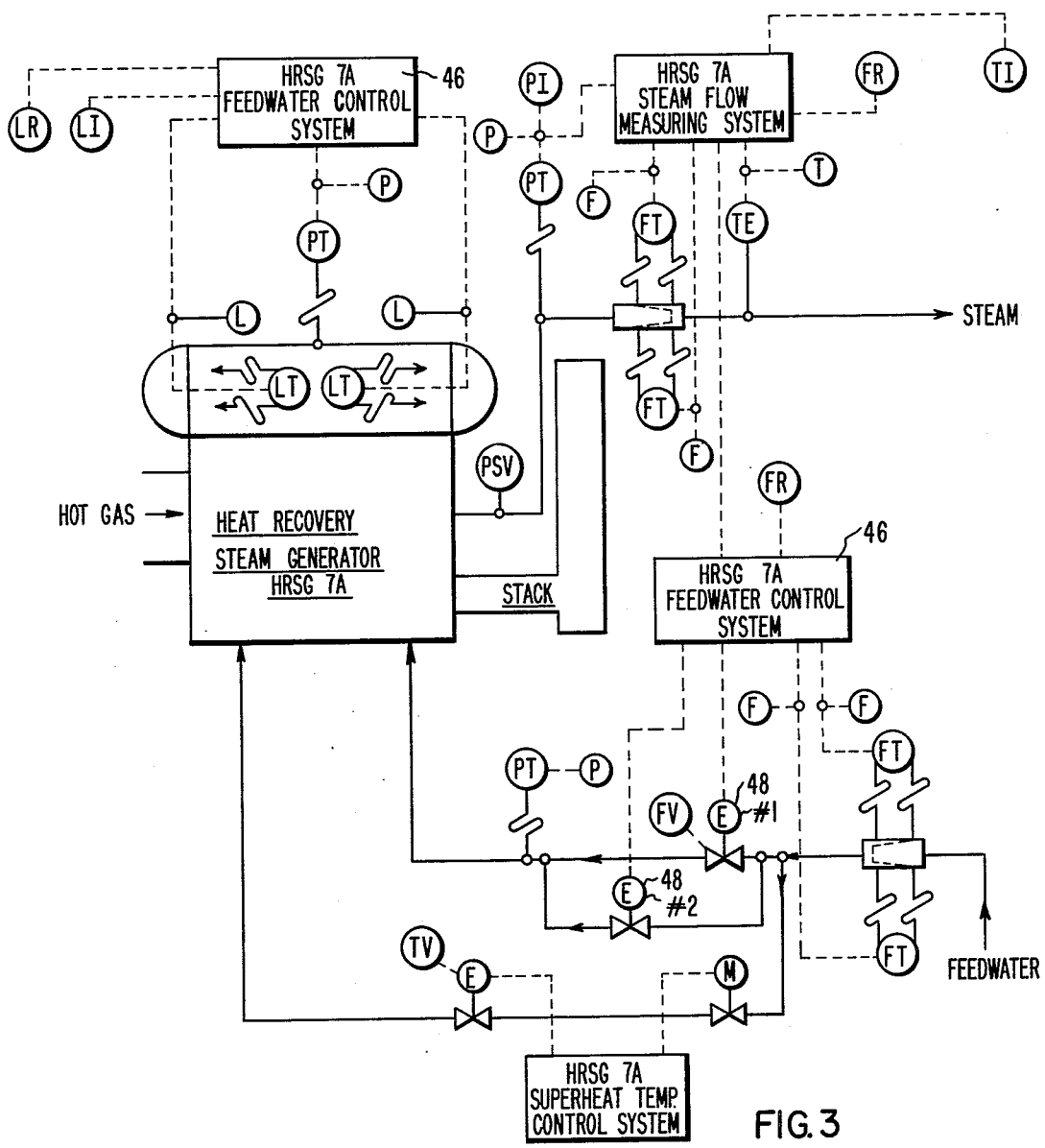
FIG. 3 shows in greater detail a schematic of a feedwater control system employed in the control system of FIG. 2.
Figure 8A:
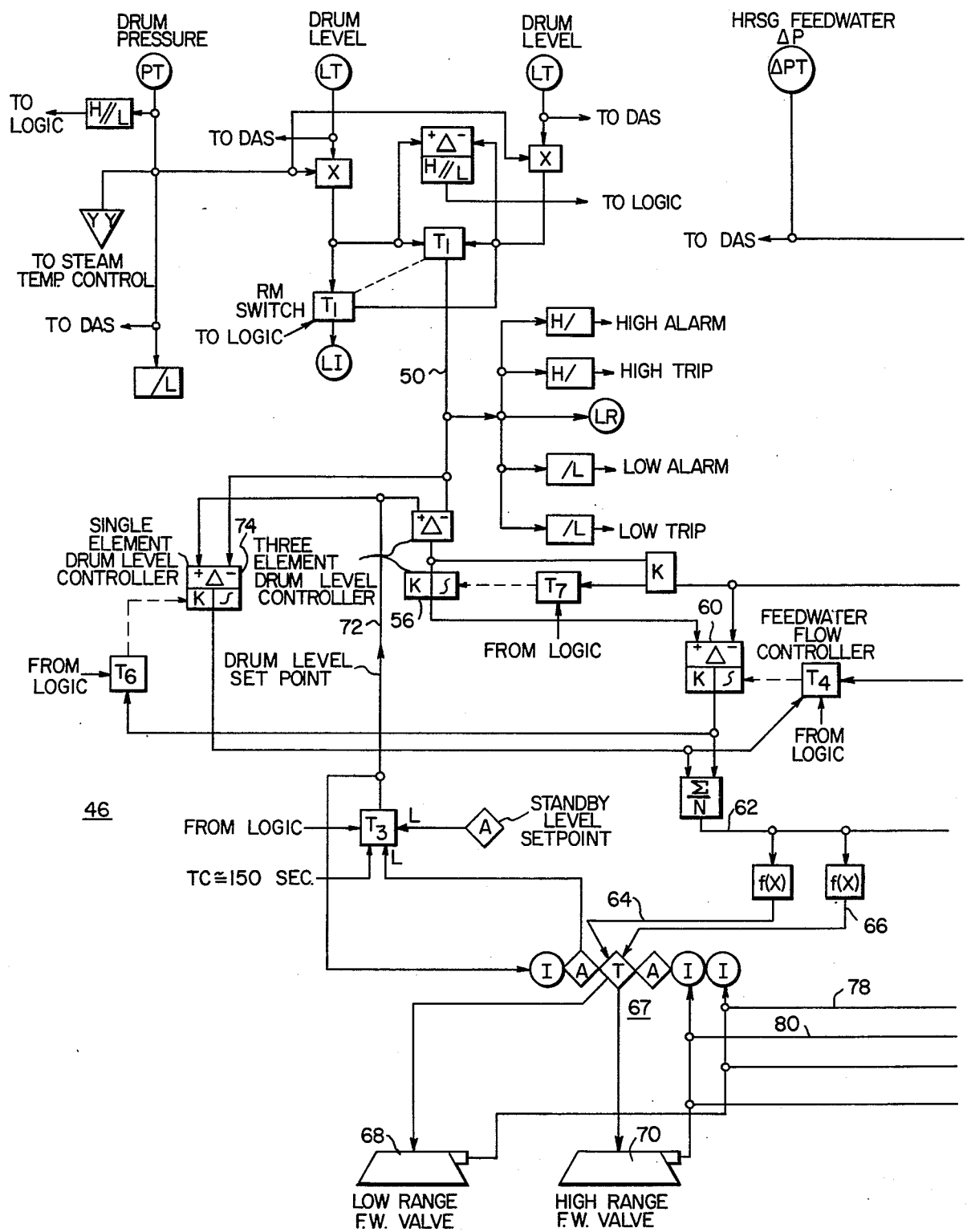
FIG. 8A-8B show an analog functional drawing for a valve control which is like that of FIG. 4 and which is arranged for operation in the feedwater control of FIG. 3.
Figure 8B:
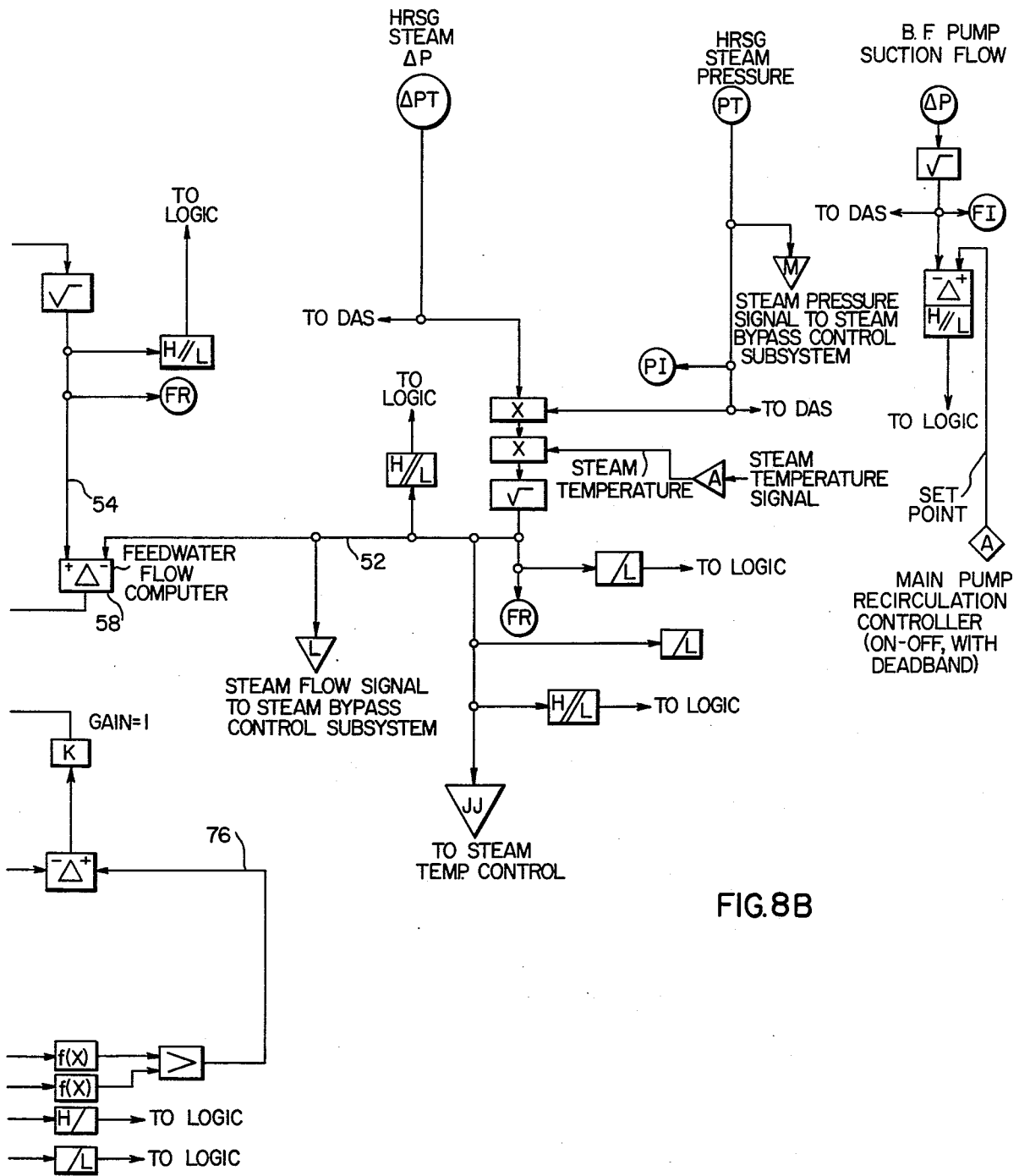

As shown in more detail in FIGS. 3 and 8, the portion of the plant control 34 which provides steam generator control includes a feedwater control system 46 which automatically holds the boiler drum level at a setpoint established by an operator or the coordinated control. In the Louisiana installation, respective low range and high range electric actuated feedwater flow control valves, indicated by two valves 48 in FIG. 3, operate in parallel in controlling the feedwater flow from a motor driven boiler feedpump. In the general practice of the invention, any number of parallel valves may be employed. The purpose of using multiple valves in controlling a single flow is normally to achieve better flow control, i.e. to achieve a broader flow range over which control is achieved with resolution higher than some specified minimum value.

Under normal operating conditions, the feedwater flow control 46 functions in a three element control mode. In this mode of operation, a pressure compensated drum level signal 50 (FIG. 8A), a pressure and temperature compensated steam flow signal 52 (FIG. 8B), and a feedwater flow signal 54 (FIG. 8B) are used by a drum level controller 56, a feedwater flow computer 58 and ultimately a feedwater flow controller 60 to develop a flow demand signal 62 from which valve position demands 64 and 66 are derived and applied through an M/A station 67 to the low range and the high range feedwater flow control valves 68 and 70 to maintain the drum level at a setpoint value 72.

The three element drum level controller 56 is enabled when the HRSG steam flow is greater than 15 percent and the feedwater flow M/A station 67 is in automatic. The feedwater flow controller 60 is also enabled under these conditions, and it is tracked by a single element drum level controller 74. When the feedwater flow M/A station 67 is transferred to manual, the three element drum level controller 56 tracks the HRSG drum level error signal amplified through its proportional gain amplifier.

In the operation of the invention in this embodiment, the feedwater flow controller 60 tracks an equivalent feedwater flow demand signal 76 which is computed from low range and high range feedwater flow valve position signals 78 and 80, and the single element drum level controller 74 tracks the feedwater flow controller 60 as already indicated. This tracking scheme enables all controllers to generate properly aligned outputs in normal operation to prevent any process upsets during a manual-to-automatic transfer.

During HRSG standby operation, when the HRSG steam flow falls below 10 percent, the feedwater flow control 46 is operated in a single element control mode. In this mode, pressure compensated drum level is compared against the drum level setpoint by the drum level controller 74 and the low range and high range feedwater flow valves 68 and 70 are modulated through proportional plus integral action to maintain the drum level at the setpoint value. The single element drum level controller 74 is enabled when the HRSG steam flow is less than 10 percent and the feedwater flow M/A station 67 is in automatic. During this mode of operation, the three element drum level controller 56 tracks the HRSG drum level error signal amplified through its proportional gain amplifier, and the feedwater flow controller 60 tracks the single element drum level controller 74. If the feedwater flow M/A station 67 is transferred to manual, the three element drum level controller 56 continues to track the HRSG drum level error, the feedwater flow controller 60 tracks the equivalent feedwater flow demand 76 computed from the low range and high range feedwater flow valve positions, and the single element controller 74 tracks the feedwater flow controller 60. This tracking scheme assures proper alignment of the outputs of all controllers in standby operation to prevent any process upsets during a manual-to-automatic transfer.

In instances where an M/A station is associated with a single valve, tracking for bumpless boiler and plant or other process transfer to automatic from manual is conventionally achieved by sensing the valve position and using the valve characterization to derive the value of the automatic process flow demand which must be applied to the M/A station to call for the existing valve position. Where multiple valves are associated with a single M/A station for operator panel and other hardware economy or other purposes as in the present disclosure, the tracking of the process flow demand generally cannot be achieved in the same way because the process flow demand must then be derived from the positions of multiple valves.

Figure 4:
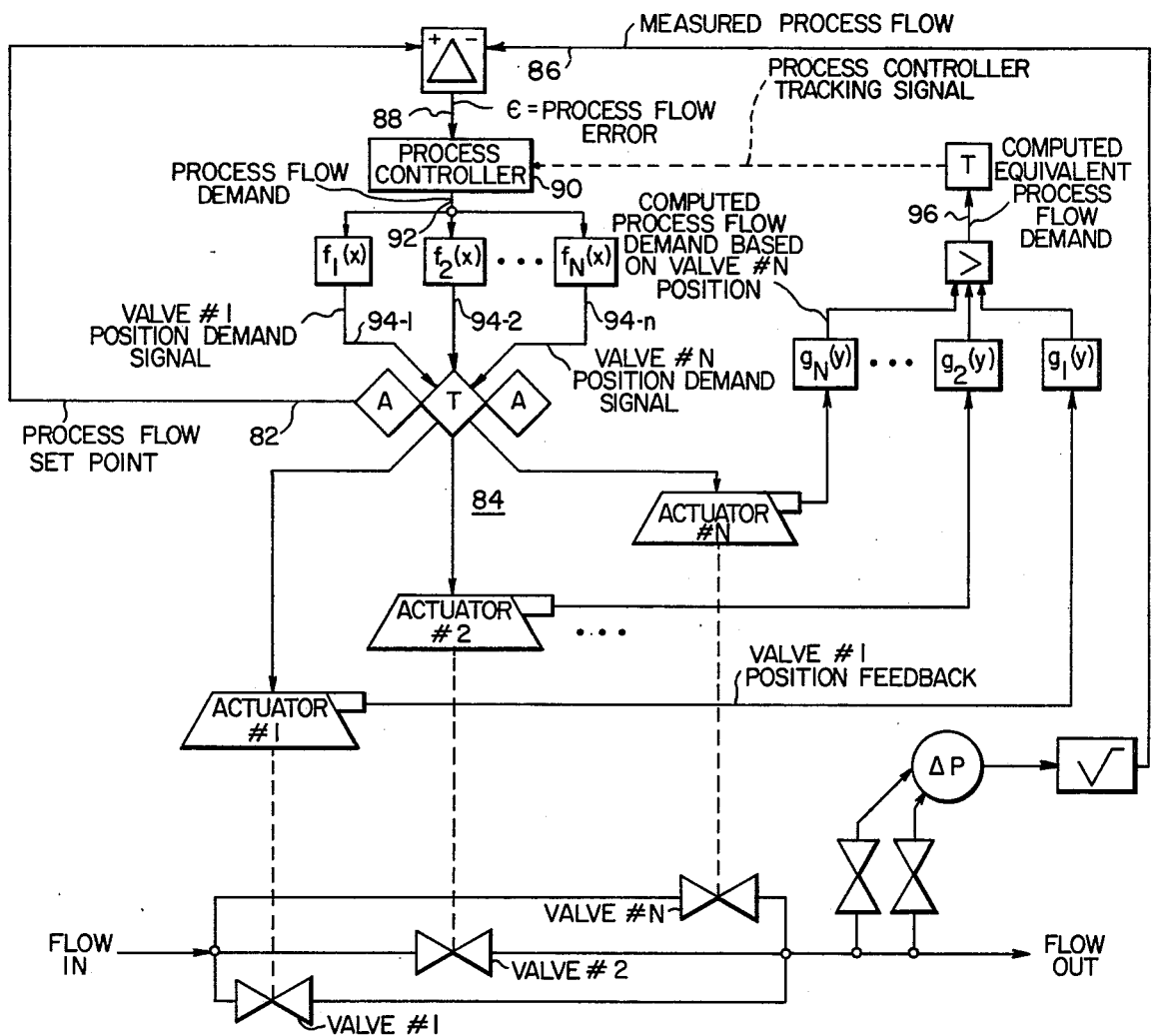
FIG. 4 shows a schematic diagram of a sequential valve control arranged in accordance with the principles of the invention for the general case of n valves.

In FIG. 4, there is shown a functional block diagram of a flow process control subsystem embodying principles of the invention in the general case of $n$ valves. Thus, there are shown $n$ control valves operating in parallel to control the process flow. Each of the valves is moved by its electric or pneumatic actuator.

A process flow setpoint 82 is established by the operator from an M/A selector station 84. The setpoint is compared with a measured process flow signal 86 and the resulting process flow error signal 88 is applied to a process controller 90 (such as one having proportional plus integral action) to produce a total process flow demand signal 92. The process flow demand signal 92 is partitioned and characterized (FIG. 5) to develop position demand signals 94-1, 94-2, . . . 94-$n$ for valve actuators No. 1 to No. $n$ through position-flow function generators $f_1(x), f_2(x), \ldots f_n(x)$, in such a way that the first segment of the process flow demand positions the first valve and the second segment of the process flow demand positions the second valve, etc., and such that the sum of the valve flows satisfies the total flow demand 92.

Further, the flow demand segments may overlap to permit opening of a valve to start before the next previous valve in the sequence has completely opened. The valve overlap operation is illustrated for two valve operation ($n = 2$) in FIG. 5. Here, a 0% to 30% process flow demand segment positions valve No. 1 from 0% to 100% through the $f_1(x)$ characterization, and a 25% to 100% process flow demand segment positions valve No. 2 from 0% to 100% through the $f_2(x)$ characterization. In the overlap region of 25% to 30% process flow demand, valve No. 2 starts to open while valve No. 1 is still continuing to open.

To provide for automatic tracking during manual operation, the position of each control valve is used to compute the equivalent process flow demand signal through respective function generators $g_1(y), g_2(y), \ldots g_n(y)$. The function generators $g_1(y), g_2(y), \ldots g_n(y)$ provide a characterization (FIG. 6) inverse to that provided by $f_1(x), f_2(x), \ldots f_n(x)$ in the total flow region not modulated by a lower ordered valve in the valve operating sequence; the output of $g_1(y), g_2(y), \ldots g_n(y)$ is set to zero in the total flow region modulated by lower order valves illustrated in the example for two valve operation ($n = 2$) in FIG. 6. Here, $g_1(y)$ is the inverse characterization of $f_1(x)$ and it is the lowest order in the entire range of operation of valve No. 1. Further, $g_2(y)$ is the inverse characterization of $f_2(x)$ and it is the lowest order only in the flow range not modulated by $g_1(y)$ and accordingly $g_2(y)$ is set to zero in the flow range modulated by $g_1(y)$, (i.e. from 0% to 30%). The computed equivalent process flow signal thus becomes zero when all valves are closed.

A high signal select of $g_1(y), g_2(y), \ldots g_n(y)$ provides an equivalent process flow demand signal 96 which holds the control valves in their respective positions when the flow has been under manual control and a transfer is made to automatic control. Manual to automatic transfer accordingly occurs bumplessly without causing boiler, plant or other process upset. The principles described in connection with FIG. 4 apply to the two valve feedwater control described in connection with FIG. 8.

Figure 7:
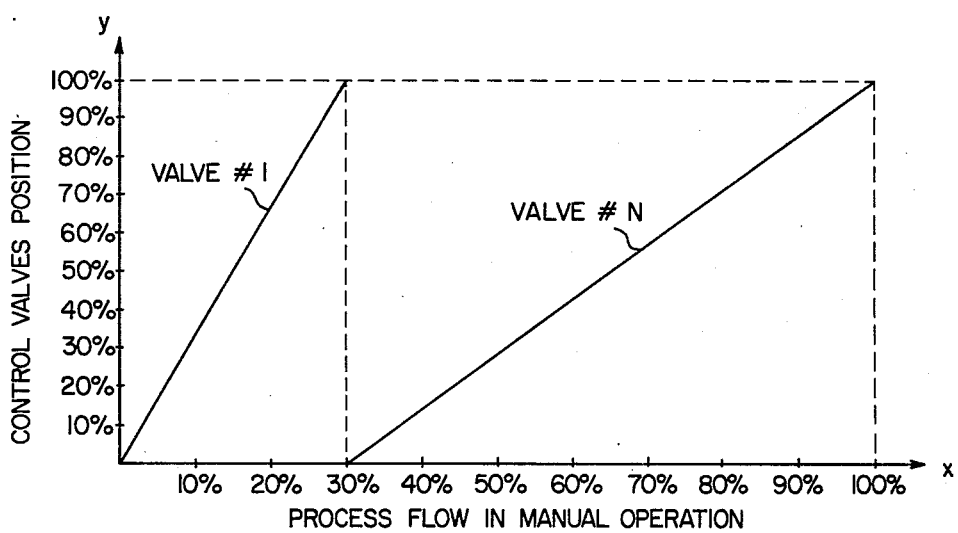
FIG. 5-7 shows graphs depicting valve position characterizations employed in the valve control of FIG. 4.
Figure 9A:
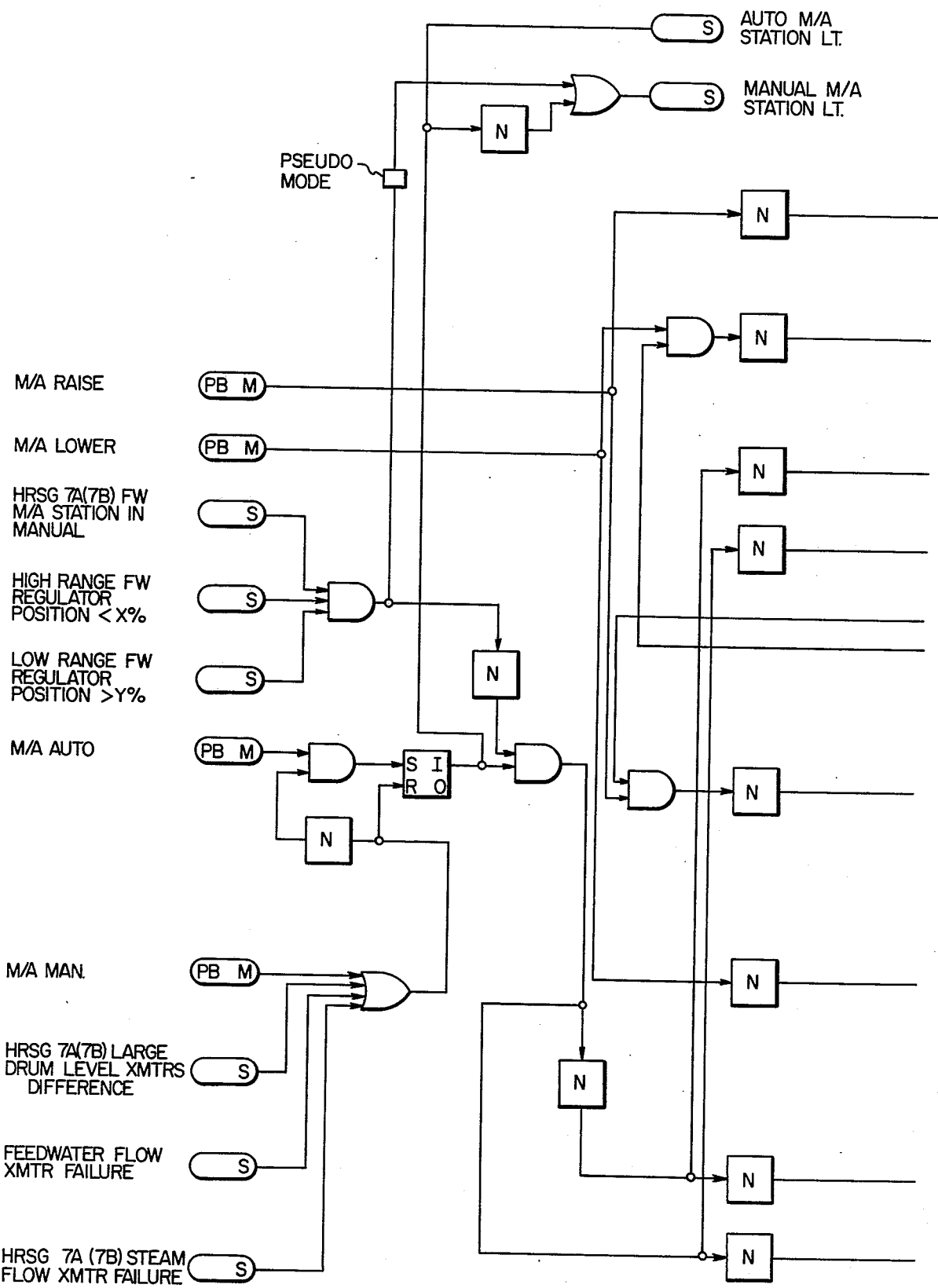
FIG. 9A -9B show a diagram of a logic system employed with the M/A station associated with the valve control of FIG. 8.
Figure 9B:
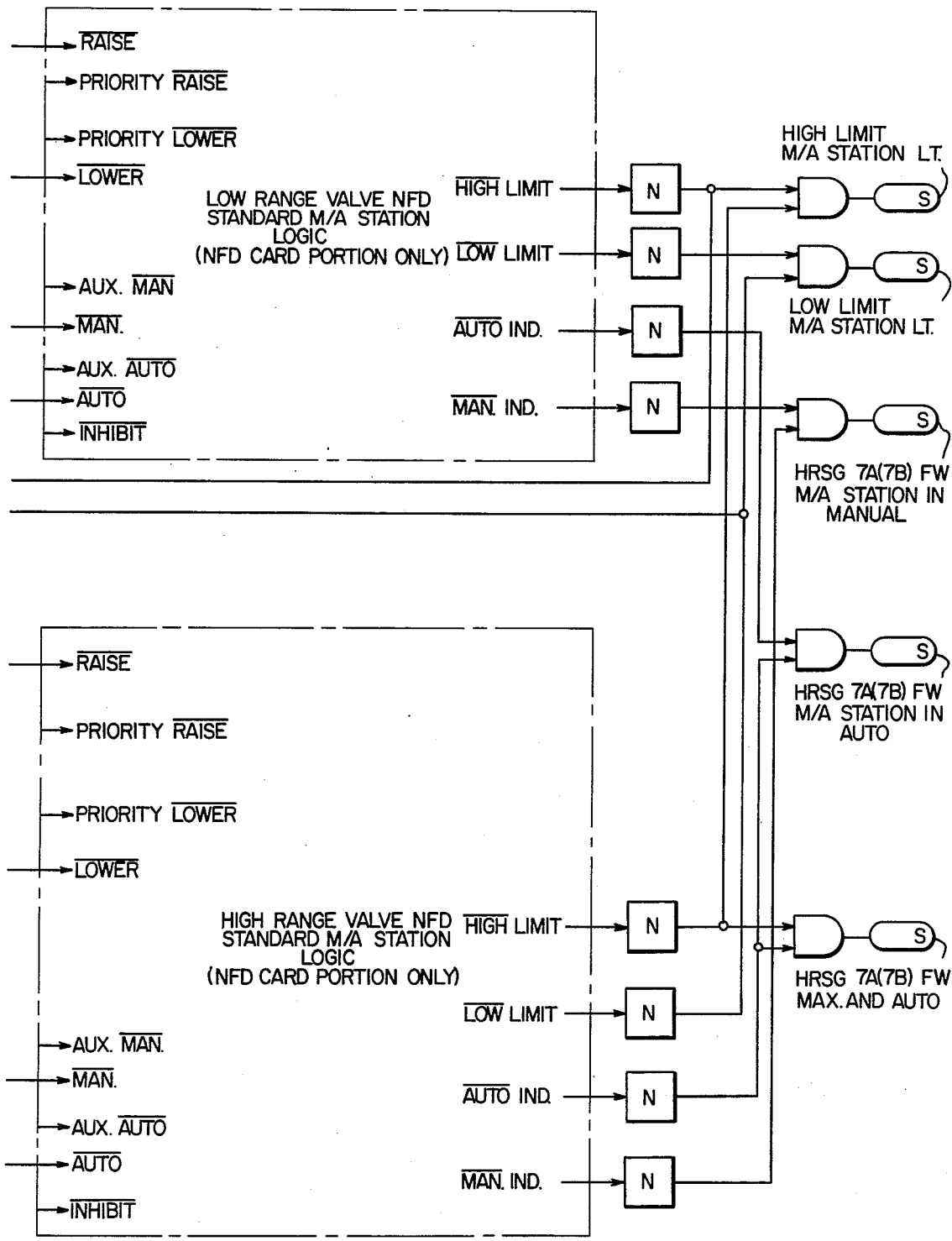

In the manual mode of operation, the valves are sequenced by logic such that 100% opening of valve No. 1 starts the opening of the valve No. 2 and so on. This is illustrated for two valve operation (n = 2) in FIG. 7. FIG. 9 shows functional logic circuitry employed in implementing this sequencing on manual operation in the flow control 46 of FIGS. 3 and 8.

Figure 5:
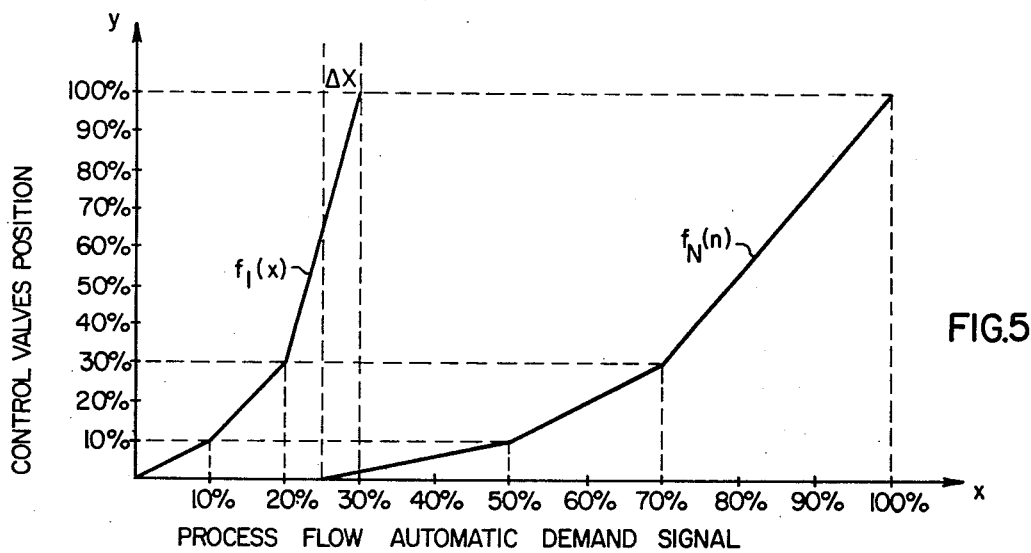
Figure 6:
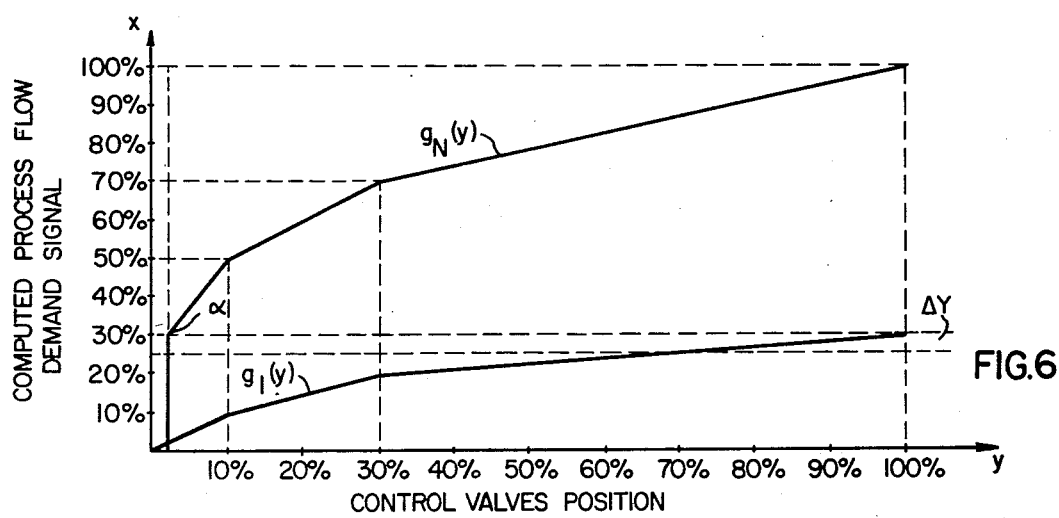

As observed in FIGS. 5 and 6, two valves operate simultaneously in an overlap region Δx during the automatic mode of operation. To prevent M/A transfer process upsets during operation in the valve overlap region, logic interlocks are used to inhibit the operator from making manual to automatic transfer in this region and the operator is informed of the inhibit condition by a light combination (e.g. automatic and manual lights). The operator can thus move the valve manually out of the flow region which constitutes a valve overlap region in the automatic mode and then transfer from manual to automatic without causing a process upset.

In summary of the specific plant embodiment (FIG. 8), the low range and high range feedwater flow control valves 68 and 70 are operated sequentially in an economic manner from a single M/A station yet bumpless M/A transfer is efficiently achieved. In automatic operation, the feedwater flow demand is divided and characterized as described in the example of FIGS. 5 and 6 such that 0% to 30% feedwater flow demand drives the low range valve from 0% to 100% position, increasing parabolically, and 25% to 100% feedwater flow demand drives the high range valve from 0% to 100% position, increasing parabolically. In automatic operation below 25% feedwater flow demand, only the low range valve 68 is modulating and the high range valve 70 remains in a closed position. Between 25% and 30% feedwater flow demand, the low range and high range valves 68 and 70 are modulating simultaneously. Above 30% feedwater flow demand, the low range valve 68 remains in the 100% open position and the high range valve 70 is modulating.

In manual operation, a manual raise signal opens the low range valve 68 to the 100% position first, and then the high range valve 70 begins to open. Similarly, a manual lower signal closes the high range valve 70 first and then the low range valve 68 begins to close.

To provide bumpless transfer from manual to automatic operation during the entire range of dual sequential valve operation, inverse characterization is performed on low range and high range valve positions to compute the equivalent feedwater flow demand signal in the manner previously described. The high signal selection of computed equivalent feedwater flow demands from the low range and high range valve positions equals the automatic feedwater flow demand, except in the valve overlop region. The feedwater flow controller 60 tracks the high select signal when the feedwater flow M/A station 67 is transferred to manual. The operator is prevented from transferring the feedwater flow M/A station 67 to automatic if the low range and high range valve positions are in the overlapping range, and the operator must manually raise or lower to get out of the overlapping valve operation region before transferring to automatic operation.

The high limit light of the feedwater flow M/A station is lit only when both low range and high range valves are at 100% position, and similarly, the low limit light of the M/A station is lit when both valves are at 0% position.

What is claimed is:

1. A multiple sequential valve control for at least two parallel valves which regulate the flow through a single path comprising an automatic flow control which generates an automatic flow demand in response to predetermined process variables in the automatic mode, means for generating a manual flow demand, a manual/automatic station for selectively transmitting the automatic or manual flow demand, means for controlling the position of a first valve over a first range of the path flow in response to the applied flow demand in accordance with a first flow/position characterization, means for controlling the position of a second valve over a second range of the path flow in response to the applied flow demand in accordance with a second flow/position characterization, means for sensing the position of each of said valves, means for generating an equivalent flow demand for said valves from outputs of said valve position sensing means, and means for coupling the equivalent flow demand to said automatic flow control in the manual mode to track the automatic flow control output to the manual demand and thereby enable bumpless manual/automatic transfer.

2. A control as set forth in claim 1 wherein said equivalent flow demand generating means comprises means for generating a first inferred valve flow demand in response to the first valve position in accordance with a characterization inverse to the first characterization, means for generating a second inferred valve flow demand in response to the second valve position in accordance with a characterization inverse to the second characterization but being set to zero value over the flow range modulated by the first valve, and means for high selecting one of said first and second inferred valve flow demands to provide the equivalent flow demand.

3. A control as set forth in claim 1 wherein the two flow ranges overlap in the automatic mode, means are provided for inhibiting manual to automatic transfer unless the flow range is outside the flow span over which overlap occurs in the automatic mode.

4. A control system for a combined cycle plant having a pair of gas turbines supplying hot exhaust gas to respective heat recovery steam generators and a steam turbine which is driven by steam generated by the steam generators, said control system comprising a plant control for setting the operating level of said turbines, a boiler control for each of said steam generators, each of said boiler controls including a multiple sequential valve control for at least two parallel valves which regulate the feedwater flow through a single path, feedwater flow control responsive to predetermined boiler variables to generate a feedwater flow demand in the automatic mode, means for generating a manual flow demand, a manual/automatic station for selectively transmitting the automatic or manual flow demand, means for controlling the position of a first valve over a first range of the path flow in response to the applied flow demand in accordance with a first flow/position characterization, means for controlling the position of a second valve over a second range of the path flow in response to the applied flow demand in accordance with a second flow/position characterization, means for sensing the position of each of said valves, means for generating an equivalent flow demand for said valves from outputs of said valve position sensing means, and means for coupling the equivalent flow demand to said automatic flow control in the manual mode to track the automatic flow control output to the manual demand and thereby enable bumpless manual/automatic transfer.

5. A plant control as set forth in claim 4 wherein said equivalent flow demand generating means comprises means for generating a first inferred valve flow demand in response to the first valve position in accordance with a characterization inverse to the first characterization, means for generating a second inferred valve flow demand in response to the second valve position in accordance with a characterization inverse to the second characterization but being set to zero value over the flow range modulated by the first valve, and means for high selecting one of said first and second inferred valve flow demands to provide the equivalent flow demand.

6. A plant control as set forth in claim 4 wherein the two flow ranges overlap in the automatic mode, means are provided for inhibiting manual to automatic transfer unless the flow range is outside the flow span over which overlap occurs in the automatic mode.

7. A control system for a boiler in an electric power plant comprising a multiple sequential valve control for at least two parallel valves which regulate the flow through a single feedwater flow path, an automatic feedwater flow control responsive at least to boiler steam flow and feedwater flow to generate a feedwater flow demand in the automatic mode, means for generating a manual flow demand, a manual/automatic station for selectively transmitting the automatic or manual flow demand, means for controlling the position of a first valve over a first range of the path flow in response to the applied flow demand in accordance with a first flow/position characterization, means for controlling the position of a second valve over a second range of the path flow in response to the applied flow demand in accordance with a second flow/position characterization, means for sensing the position of each of said valves, means for generating an equivalent flow demand for said valves from outputs of said valve position sensing means, and means for coupling the equivalent flow demand to said automatic flow control in the manual mode to track the automatic flow control output to the manual demand and thereby enable bumpless manual/automatic transfer.

8. A boiler control as set forth in claim 7 wherein said equivalent flow demand generating means comprises means for generating a first inferred valve flow demand in response to the first valve position in accordance with a characterization inverse to the first characterization, means for generating a second inferred valve flow demand in response to the second valve position in accordance with a characterization inverse to the second characterization but being set to zero value over the flow range modulated by the first valve, and means for high selecting one of said first and second inferred valve flow demands to provide the equivalent flow demand.

9. A boiler control as set forth in claim 7 wherein the two flow ranges overlap in the automatic mode, means are provided for inhibiting manual to automatic trnasfer unless the flow range is outside the flow span over which overlap occurs in the automatic mode.

* * * * *